United States Patent
Kirshenbaum et al.

(10) Patent No.: US 6,173,309 B1
(45) Date of Patent: *Jan. 9, 2001

(54) NULL THREAD LIBRARY AND THREAD ABSTRACTION INTERFACE

(75) Inventors: Evan Kirshenbaum, Mountain View; Keith Moore, Santa Clara; Walter R. Underwood, Mountain View, all of CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/803,404

(22) Filed: Feb. 20, 1997

(51) Int. Cl.[7] .................................................. G06F 9/00
(52) U.S. Cl. ................................................ 709/107; 717/10
(58) Field of Search .................................. 709/107, 202, 709/104, 328; 395/705, 706, 710; 717/5, 6, 10

(56) References Cited

U.S. PATENT DOCUMENTS

| | | | |
|---|---|---|---|
| 5,452,459 | * 9/1995 | Drury et al. | 395/700 |
| 5,465,363 | * 11/1995 | Orton et al. | 395/700 |
| 5,481,706 | * 1/1996 | Peek | 395/650 |
| 5,630,136 | * 5/1997 | Davidson et al. | 395/676 |
| 5,717,926 | * 2/1998 | Browning et al. | 395/674 |
| 5,742,822 | * 4/1998 | Motomura | 395/672 |
| 5,951,653 | * 9/1999 | Hill et al. | 709/304 |
| 5,953,530 | * 9/1999 | Rishi et al. | 395/704 |

OTHER PUBLICATIONS

SunSoft, Multithreaded Programming Guide, Sun Microsystems, Inc., pp. 101–109, 1994.*

M. B. Jones, "Bringing the C Libraires with Us into a Muti–Threaded Future", USENIX, Winter '91, pp. 81–91, 1991.*

* cited by examiner

*Primary Examiner*—Majid Banankhah
*Assistant Examiner*—Sue Lao
(74) *Attorney, Agent, or Firm*—Thomas Li

(57) ABSTRACT

User code is operated in either a multithreaded or non-threaded programming environment by linking the code to different libraries. A standard thread library is linked with the code when operated in a multithreaded mode. A null thread library is linked to the code to operate in a non-threaded mode. The different libraries are linked to the user code through a common application programming interface allowing the same thread function calls to operate in either the multithreaded or non-threaded mode. The null thread library implements thread function calls as blocking functions which synchronize thread launches while eliminating the performance and memory overhead required in multi-threaded processes.

16 Claims, 6 Drawing Sheets

EXAMPLES OF NULL THREAD LIBRARY CALLS

NULL THREAD LIBRARY AND THREAD ABSTRACTION INTERFACE

FIELD OF THE INVENTION

This invention relates generally to multithreaded programming and more particularly to a system for operating common code in both a non-threaded and a multithreaded environment.

BACKGROUND

A multithreaded programming environment allows programmers to request execution of multiple threads at the same time. However, multithreaded programs must manage contention for data between threads which may result in severe performance penalties. Multithreaded systems must allow context switching between threads and support mutual exclusion. When the performance penalty of a multithreaded environment is deemed too severe, users often give up the flexibility of multithreading and run programs non-threaded.

One common solution to the performance penalty problem in multithreaded systems is to have two versions of the program. One version of the program is designed to run threaded and one version of the program is designed to run non-threaded. This technique has the drawback that separate versions of the source code must be maintained and tested.

Another common solution uses a conditional compilation feature of a preprocessor to compile the same source files to produce different binaries for threaded and non-threaded execution. The thread management code is then ignored when compiling the non-threaded case. However, conditionally compiled code is extremely difficult to debug and test.

A third solution is to use a single source and simply test at run time whether threading is desired. This has the disadvantages that (1) it is generally still necessary to link with the thread library, causing a potentially large growth in size, (2) some thread packages impose a performance penalty for their own bookkeeping, etc., merely by being loaded, and (3) there is a performance cost for checking whether to run in a threaded or non-threaded mode.

When code is written for a threaded environment, the programmer generally needs to be aware of which threading package they are writing for. Thread package interfaces differ greatly from platform to platform making portability of code difficult.

The problem with different thread package interfaces is generally ignored. Code is typically written for a single platform and therefore a single thread package. If portability is desired, separate source or conditional compilation models as described above are generally used. Separate source or conditional compilation code has the disadvantages of maintaining and supporting multiple versions of similar code and increases debug and testing complexity.

Accordingly, a need remains for code that operates efficiently in both a multithreaded and a non-threaded environment without significantly increasing code complexity or decreasing performance.

SUMMARY OF THE INVENTION

A thread model is abstracted into a single interface providing objects and facilities for launching threads, ensuring mutual exclusion, maintaining thread-specific data, etc. The implementation of the interface is implemented in terms of any particular thread package, and the question of which thread package to use is left for program link time. The single interface abstracts away the peculiarities of any particular thread package. The programmer then creates a single program written in terms of the interface which is able to work with any of the thread packages.

The foregoing and other objects, features and advantages of the invention will become more readily apparent from the following detailed description of a preferred embodiment of the invention which proceeds with reference to the accompanying drawings.

DETAILED DESCRIPTION

Figure 1:
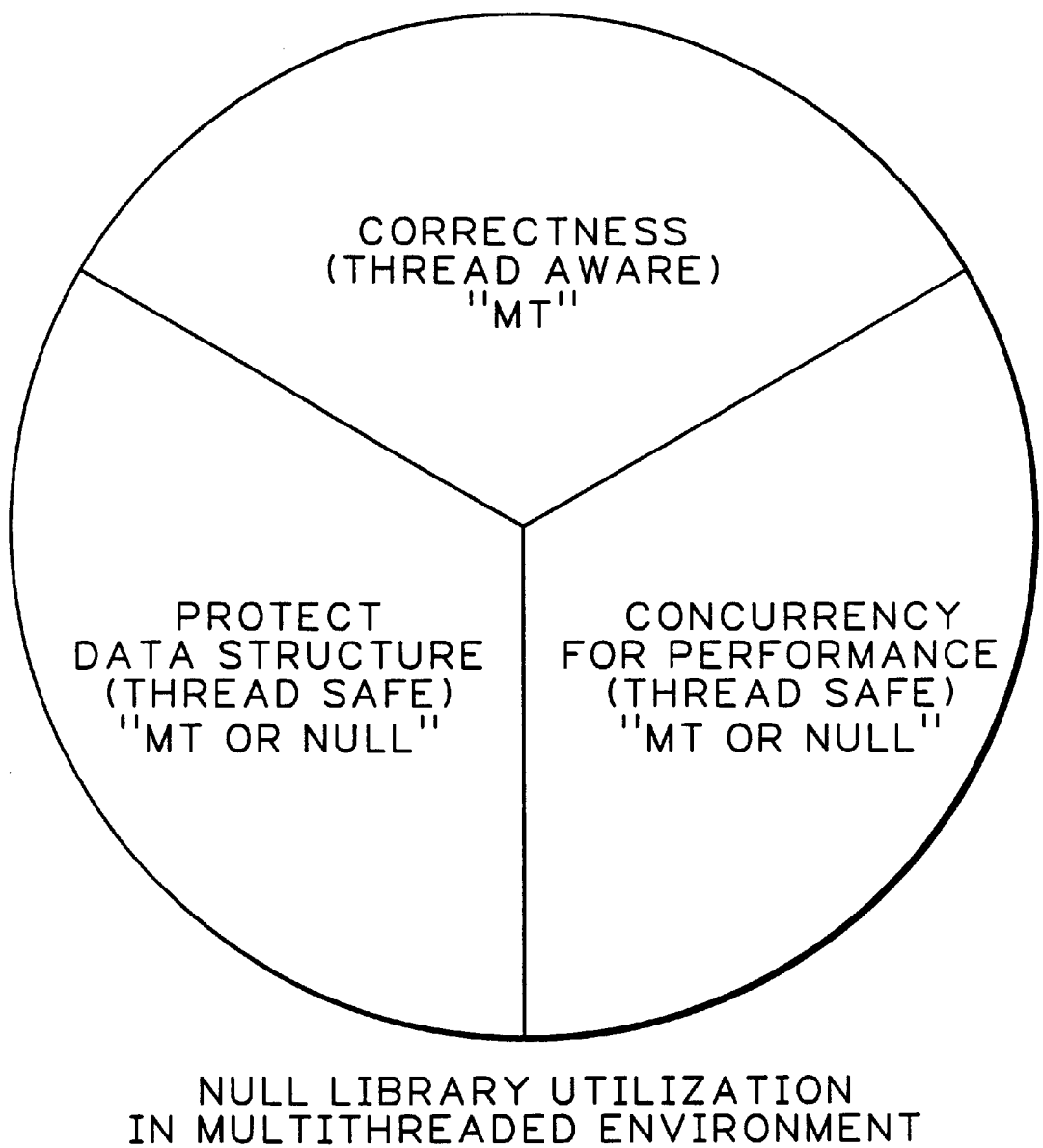
FIG. 1 is diagram showing different categories of multithreaded code.

Referring to FIG. 1, code operating in a multithreaded (MT) environment is grouped generally into three different categories. "Concurrency for Performance" code improves code performance by launching multiple concurrent threads. "Concurrency for performance" code requires that data structures be maintained in a "thread safe" condition so that data is not manipulated by two different threads at the same time. While concurrency in a multithreaded environment generally improves code performance, the code can alternatively be run in a non-threaded synchronous manner and still provide accurate results.

Code in a "Protect Data Structure" category does not have increased performance in a multithreading environment. This is code that experiences a slight performance penalty from the processing overhead in multithreading libraries required for controlling multiple threads and protecting thread specific data. Code in a "Correctness" category must operate in a multithreaded environment in order to operate correctly and is defined as being thread aware. "Correctness" code cannot operate in a non-threaded environment.

The present invention allows "Concurrency for Performance" and "Protect data Structure" code to run in both a multithreaded and non-threaded environment and maintain the code as thread safe. Code in the "Correctness" category is either avoided or parallel thread safe code performing a similar function as the thread aware code is used. At run time, the parallel code operates when in the non-threaded environment.

In order to handle both multithreaded and non-threaded environments, a "null implementation" of the thread abstraction interface is created.

The term "null implementation" does not mean empty, but rather that the library is implemented such that: (1) thread launch is treated as a simple blocking function call, (2) mutual exclusion (mutex) objects always succeed in locking and unlocking, and (3) thread-specific data is kept as simple global data. The behavior of other parts of the interface are similarly defined. The null implementation is also selectable at program link time.

The null thread library allows the programmer to create a single source code which is valid whether or not the program is actually linked with threads. In particular, the notion that mutexes always succeed allows the programmer to always protect access to data which would be problematic if running threaded. While linked to the null thread library, there is by definition no other thread of control which could contend with the one attempting the lock. Thus, the behavior of always succeeding in calling a mutex function is thread safe.

The thread abstraction interface is able to answer the question of whether it is implemented to run in a multi-threaded environment. Some applications will use different code depending upon whether the application is being run in truly concurrent environment or run in a non-concurrent environment. In this manner, code which rely on concurrency for correctness is run only when the application is liked with a multi-threaded library.

The null thread library also supports limited concurrent asynchronous operations that are normally supported in non-threaded systems. For example, since interrupts are often used to signal asynchronous events in non-threaded applications, the null thread library allows an application to block on a condition variable waiting for an interrupt to signal the condition.

Figure 2:
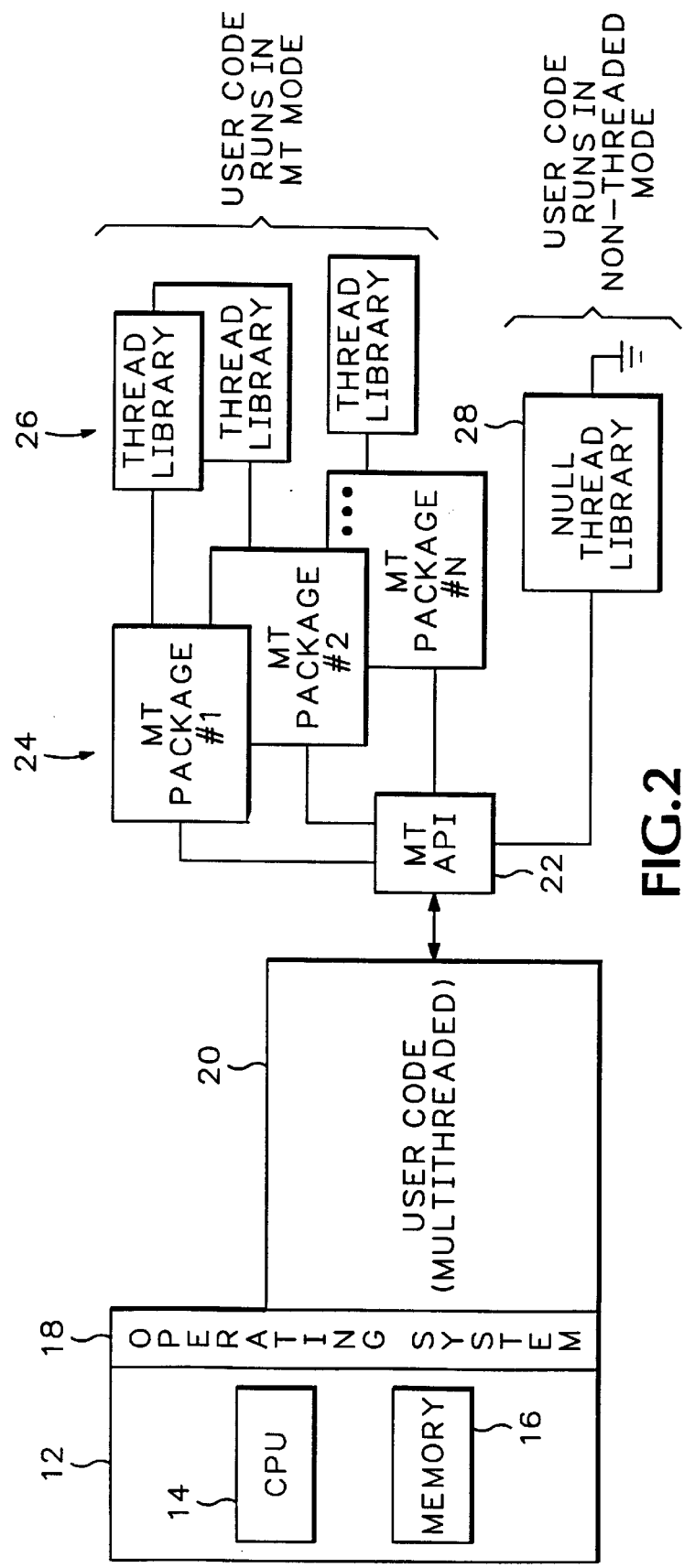
FIG. 2 is diagram showing a system multithreaded abstraction layer and a null thread library according to the invention.

Referring to FIG. 2, a computer system 12 includes a central processing unit (CPU) 14 and memory 16 for running software programs. The computer operating system 18 interacts with user code 20. The user code 20 is written either to perform software applications locally on computer 12 or over a network on remote computer systems. The user code can be a stand-alone program or operate in conjunction with other software code and is implemented in any variety of available programming languages and techniques such as object oriented programming using C ++.

The user code 20 is written for a multithreaded application programming interface (MT API) abstraction layer 22 where the same functions calls are implementable in terms of different multithreaded packages such as Portable Operating System Interface (POSIX), Microsoft Foundation Class (MFC), Windows NT or Sun Light-weight Threads. The MT API 22 allows the user code 20 to be written in one common API and then linked to any one of a variety of multithreaded package implementations 24. The multi-threaded packages 24 each implement thread function calls using an associated thread library 26.

Of significant importance is a null thread library 28 that is selectively linked to the user code 20 through the MT API 22. The null thread library 28 does not use a thread library 26 in order to successfully carry out thread function calls in the user code 20. The null thread library 28 is implemented in a manner that exploits the fact that when linked to the user code, the program is intended to run in a non-threaded environment. When linked to the null thread library, the user code 20 operates in a substantially single threaded mode. Instead of checking whether the application is multi-threaded each time, or using expensive synchronization primitives, the null thread library can implement the common API in a minimal way (e.g., mutex calls always succeed, thread priority adjustments are ignored, and the current thread of control is used rather than having to launch a new threads for threaded function calls).

Figure 3:
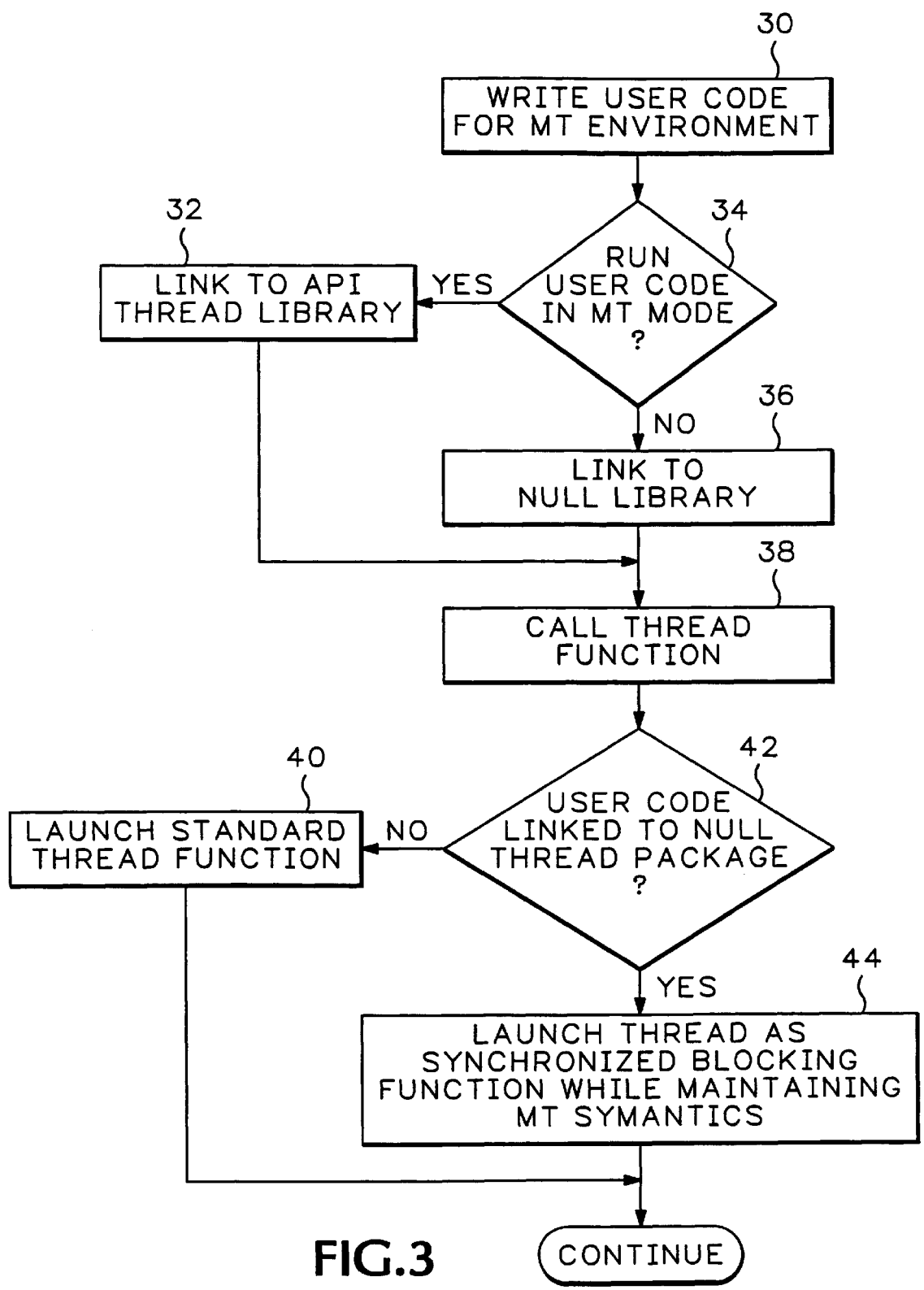
FIG. 3 is a step diagram showing the operation of the system in FIG. 2.

FIG. 3 is a step diagram showing the operation of the system shown in FIG. 2. In step 30, user code is written to operate in a MT environment. For example, calls are made to thread functions that are presumed to operate concurrently with other thread function calls. A user in step 34 makes a decision whether to run the user code 20 in a multithreaded mode or a non-multithreaded mode. For example, the user code 20 (FIG. 2) may not have increased performance when operated in a multithreaded mode. In this situation, the code may be run in a non-threaded mode. Another reason for linking with the null library is when the application is to be run on a platform for which no true thread implementation exists (but re-writing the application code is not cost-effective).

If the user desires to run the user code 20 in a MT mode, step 32 links the user code 20 to one of the multithreaded packages 24 shown in FIG. 2. To run the program in a non-threaded mode, the user in step 36 links the user code to the null thread library 28 in FIG. 2. Operation of the user code 20 is then initiated through computer 12.

During run time, a thread function is called in step 38. The user code operates differently depending upon whether the code is linked to a standard MT package 24 or to the null thread library 28. Decision step 42 represents the divergence in operation of the program according to how the user code is linked. If the user code 20 is linked to one of the standard MT packages 24, step 40 launches a standard thread function corresponding to the thread implementation in the MT package 24. If the user code 20 is linked to the null thread library 28, step 44 operates the thread function call as a synchronized blocking function while maintaining multi-threading semantics.

Figure 4:
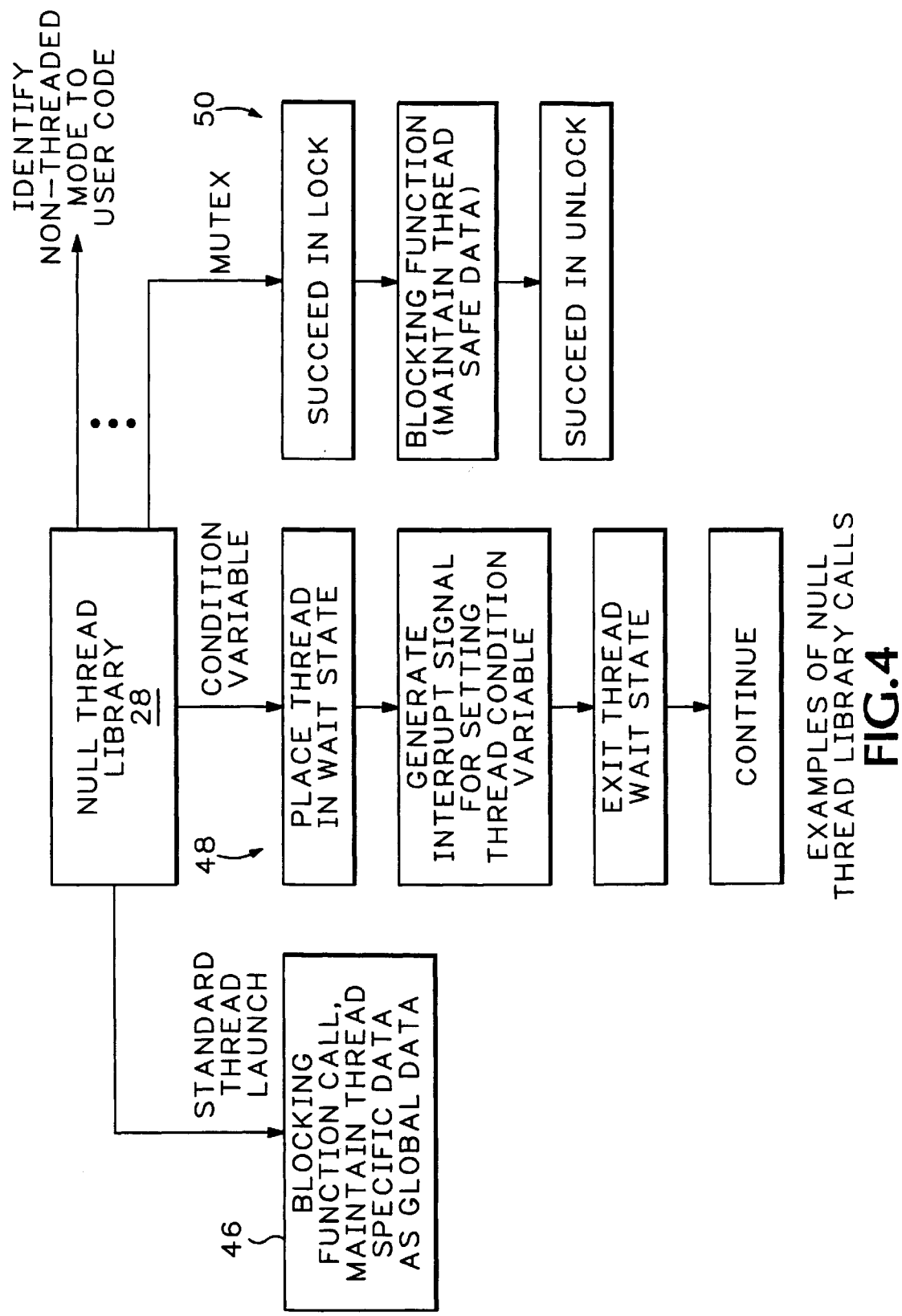
FIG. 4 is a block diagram showing how different thread function calls are performed in the null thread library.

FIG. 4 is a block diagram showing some examples of how thread function calls are handled in the null thread library 28. In general, all thread function calls 46 are handled as simple function calls as described above and all thread specific data is maintained as global data. For example, a call of the form:

t=new Thread(f, data)||execute(*f)(data) in a new thread is threaded as if it were of the form t=(*f)(data).

When linked to the null thread library 28, a thread function call for a mutex 50 always succeeds. Correspondingly, a mutex unlock always succeeds. The null thread implementation exploits the knowledge that the data that would normally have to be protected with a mutex cannot be changed by another thread (because there are no other threads). The null thread library can therefore be extremely efficient in its implementation of the thread API. In many situations code linked to the null thread library has increased performance.

Special code is provided in the null library 28 for condition variables 48. Even in a non-threaded environment, some functions such as control "C" interrupts and other hardware interrupts occur asynchronously in parallel with other code. The null thread library supports asynchronous conditions in the non-threaded mode since these conditions commonly exist in non-threaded environments.

The following is one implementation example how a variable is handled in the null thread library 28. A thread containing an interrupt condition variable 48 is first placed in an wait state as shown below in function f.

```
f() {
        mutex.lock ();
            while (!signaled) {
                cv_key_entered.wait (mutex);
            }
        mutex.unlock();
}
```

The condition variable cv_key_entered.wait( ) function call is implemented in the null thread library as follows:

```
NULL_CV::wait () {
        waiting =          // private data member
        while (waiting) {
                sleep(0);  // wait for interrupt
        }
}
```

The condition variable call cv_key_entered then waits until an interrupt is received. The interrupt then initiates the following function g.

```
g()
{
        mutex.lock ();
        signaled = 1;
        cv_key_entered.signal ();
        mutex.unlock();
}
```

When the interrupt is generated, the condition variable signal is set and the thread taken out of the wait state. The thread then exits the condition and continues. The call to the condition variable cv_key_entered.signal ( ) is implemented in the null thread library as follows:

```
NULL_CV::signal ()
{
        waiting = 0;       // same variable as in wait()
}
```

If it is possible for the variable "waiting" to be signaled before the condition variable is placed in a wait state, the variable can be tri-stated to allow detection of an already existing condition. Most coding conventions for using condition variable make tri-stated checking unnecessary.

Figure 5:
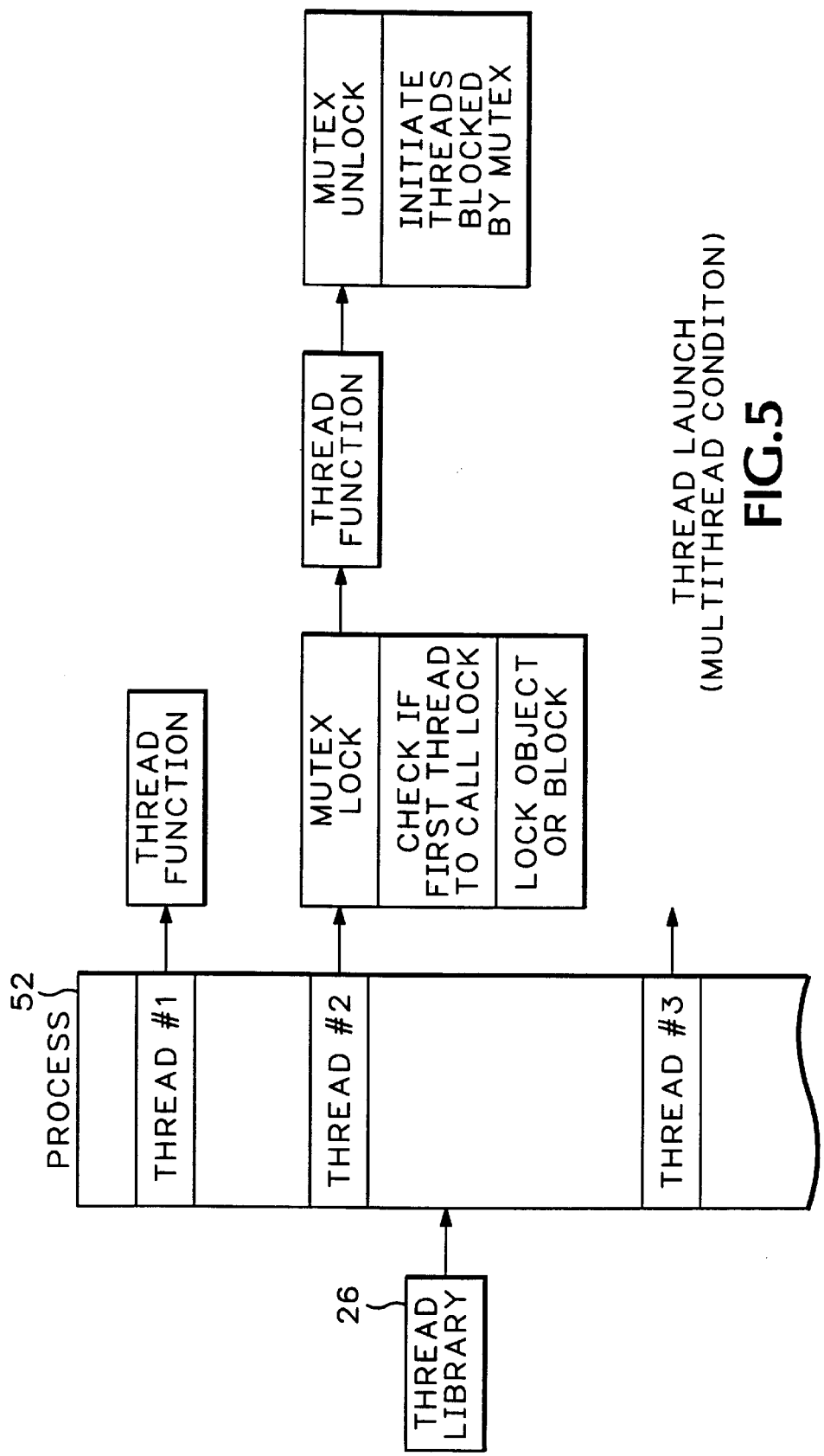
FIG. 5 is a diagram showing asynchronous thread launching in a program linked to a standard thread library.
Figure 6:
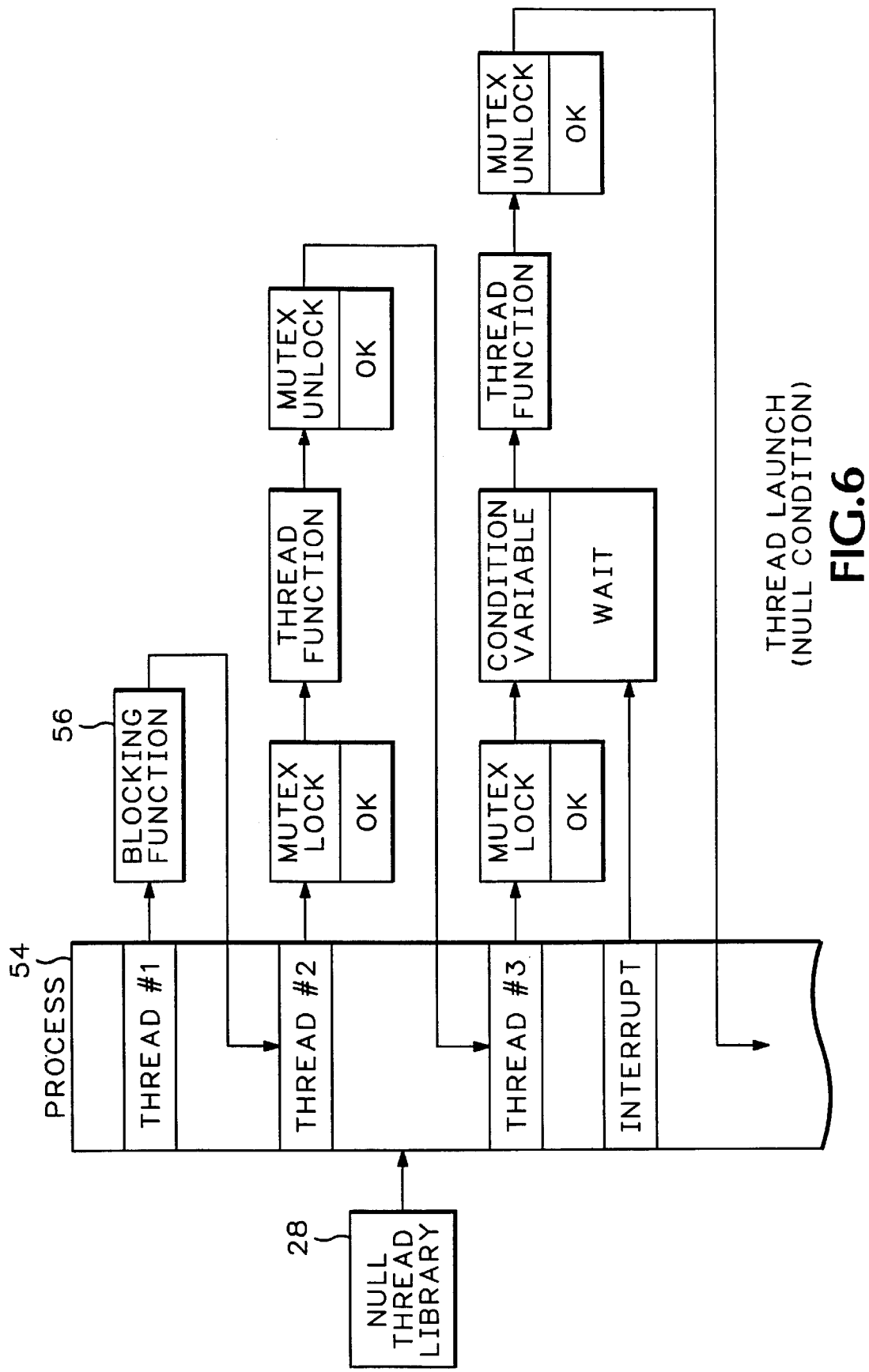
FIG. 6 is a diagram showing synchronous thread launching in a program linked to the null thread library.

FIG. 5 is a diagram showing process flow for user code linked to a standard thread library. FIG. 6 is a diagram showing process flow for user code linked to the null thread library 28. Referring to FIG. 5, threads #1, 2, and 3 can each be asynchronously launched from process 52 at any time. The function call launched in thread #2 includes a mutex lock. The system preforms the administrative processing required for performing the mutex lock from a standard threaded library. For example, the system determines whether thread #2 is the first thread to call lock on the identified data and accordingly locks or waits to lock the data. Upon a successful mutex lock, thread #2 performs a given function and then unlocks the data after completion of the given function so other threads can access the data. Other thread function calls can also be launched concurrently with the mutex call.

Referring to FIG. 6, process 54 is linked to the null thread library 28. A thread #1 operates as a synchronized blocking function 56. The second thread #2 launched in process 54 includes the same thread mutex call as described in process 52 in FIG. 5. However, the mutex call to the null thread library 28 is always successful. Since there is no possible contention from competing threads (as there are no other threads), data is always (trivially) thread-safe, and therefore, mutex locking and unlocking can always succeed immediately. The process 54 synchronously progresses through additional thread calls in the process 54.

Referring back to FIG. 1, there are categories of user code that cannot be implemented using a null thread library. As an example, since no other thread exists, it would be pointless to wait on a condition variable. If program logic requires concurrent execution of multiple threads to maintain the correctness of the code, the implementation of a thread launch as just a function call will not work.

To handle these cases, a function is provided by which the program can tell if it is linked with the null thread library. Accordingly, thread aware portions of user code are executed only when linked to a threaded library. The following is an example showing how thread aware code is selectively executed according to whether the code is linked to a thread or null-thread library. When the code is linked to the multi-threaded library, the parallel thread code is run. When the code is not linked to a multi-threaded library, an equivalent non-threaded portion of code is executed or an error generated.

```
if (MS_API::have_multiple_threads ())  //check if null thread
library
{
   run parallel thread aware code
} else {
   run non-threaded code or generate error
}
```

One example of thread aware code may include a first thread that produces data and a second thread that consumes the data produced by the first thread. Since it is necessary for the two threads to run in parallel, the operation cannot function in the non-threaded environment. Thus, the code must be written in an alternative fashion when linked to the null thread library. For example, the data producing and data consuming portions of the user code can be written to alternate back and fourth.

The null thread library 28 is also useful during software debugging. When linked to the null thread library, the user code 20 runs essentially serially allowing use of a wider variety of software debug tools (many tools do not work well in a multi-threaded environment). In this manner, application code can be tested and debugged in a non-threaded environment to detect programming errors and then tested fully threaded to detect problems due to concurrency. The thread library can be instrumented to assist in tracing concurrency issues.

Since the user code interfaces to thread libraries and null thread libraries through a common API, the same code can be linked to either libraries supporting a multithreaded environment or a single threaded environment. Thus, a single piece of source code operates in both a multithreaded and non-threaded environment. The user code also has the advantage of not having the overhead associated with multithreaded libraries when linked to the null thread library.

Thus, the null thread library allows the same code to operate more efficiently in a wider variety of systems while simplifying code maintenance, testing and version tracking.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method of operating a program, comprising the steps of:

providing a multithreaded application programming interface (API) having a set of thread functions including a function for creating a new thread;

adapting the program to run a set of multiple threads in a threaded environment using calls to one or more of the thread functions of the multithreaded API;

providing a set of multithreaded libraries each of which is an implementation of the thread functions that provides the threaded environment for the threads;

providing a null library which is a null implementation of the thread functions that provides a non-threaded environment for the threads by operating the function for creating the new thread as a synchronized blocking function;

linking the program to one of the multithreaded libraries if the program is to be operated in the threaded environment using one of the implementations of the thread functions;

linking the program to the null library if the program is to be operated in the non-threaded environment using the null implementation.

2. The method of claim 1, wherein the multithreaded API provides an abstraction layer that enables the program to call any one of the implementations of the thread functions by calling the thread functions of the multithreaded API.

3. The method of claim 1, wherein the null implementation of the thread functions operates the thread functions as synchronized blocking functions while maintaining multithreading semantics for the program.

4. The method of claim 3, wherein the null implementation maintains multithreading semantics for the program by always succeeding when locking and unlocking mutual exclusion objects.

5. The method of claim 3, wherein the null implementation maintains multithreading semantics for the program by maintaining thread-specific data for the program as global data.

6. The method of claim 1, wherein the null implementation enables the program to block on a variable associated with a condition while waiting for an interrupt to signal the condition.

7. The method of claim 1, further comprising the step of providing a function for detecting whether the program is linked to the null library.

8. The method of claim 7, further comprising the steps of:

running a thread aware code portion of the program when the function indicates the program is not linked to the null library;

running a thread safe code portion of the program when the function indicates the program is linked to the null library.

9. A system for operating a program, comprising:

multithreaded application programming interface (API) having a set of thread functions including a function for creating a new thread;

a set of multithreaded libraries each of which is an implementation of the thread functions that provides a threaded environment;

null library which is a null implementation of the thread functions that provides a non-threaded environment by operating the function for creating the new thread as a synchronized blocking function;

program which is adapted to run a set of multiple threads in the threaded environment using calls to one or more of the thread functions of the multithreaded API and which is linked to one of the multithreaded libraries if the program is to be operated in the threaded environment using one of the implementations of the thread functions and which is linked to the null library if the program is to be operated in the non-threaded environment using the null implementation.

10. The system of claim 9, wherein the multithreaded API provides an abstraction layer that enables the program to call any one of the implementations of the thread functions by calling the thread functions of the multithreaded API.

11. The system of claim 9, wherein the null implementation of the thread functions operates the thread functions as synchronized blocking functions while maintaining multithreading semantics for the program.

12. The system of claim 11, wherein the null implementation maintains multithreading semantics for the program by always succeeding when locking and unlocking mutual exclusion objects.

13. The system of claim 11, wherein the null implementation maintains multithreading semantics for the program by maintaining thread-specific data for the program as global data.

14. The system of claim 9, wherein the null implementation enables the program to block on a variable associated with a condition while waiting for an interrupt to signal the condition.

15. The system of claim 9, further comprising a function for detecting whether the program is linked to the null library.

16. The system of claim 15, wherein the program includes a thread aware code portion which is run when the function indicates the program is not linked to the null library and a thread safe code portion which is run when the function indicates the program is linked to the null library.

* * * * *